United States Patent
Campbell

(10) Patent No.: US 11,522,326 B2
(45) Date of Patent: Dec. 6, 2022

(54) WHIRLPOOL BATH CONTROLLER WITH INTELLIGENT LOAD CONTROL TO REDUCE POWER REQUIREMENTS

(71) Applicant: Balboa Water Group, LLC, Costa Mesa, CA (US)

(72) Inventor: Graham J. Campbell, Irvine, CA (US)

(73) Assignee: Balboa Water Group, LLC, Costa Mesa, CA (US)

(*) Notice: Subject to any disclaimer, the term of this patent is extended or adjusted under 35 U.S.C. 154(b) by 282 days.

(21) Appl. No.: 16/776,435

(22) Filed: Jan. 29, 2020

(65) Prior Publication Data
US 2021/0234320 A1    Jul. 29, 2021

(51) Int. Cl.
| | | |
|---|---|---|
| H02J 3/00 | (2006.01) | |
| H05K 5/00 | (2006.01) | |
| H01R 25/00 | (2006.01) | |
| A47K 3/10 | (2006.01) | |
| A61H 33/00 | (2006.01) | |

(52) U.S. Cl.
CPC ............ *H01R 25/006* (2013.01); *A47K 3/10* (2013.01); *A61H 33/0087* (2013.01); *A61H 33/0095* (2013.01); *A61H 33/6026* (2013.01); *A61H 33/6068* (2013.01); *H02J 3/00* (2013.01); *H05K 5/0017* (2013.01); *A61H 2033/0062* (2013.01); *A61H 2201/5097* (2013.01)

(58) Field of Classification Search
CPC ....... H01R 25/006; H02J 3/00; H05K 5/0017; A47K 3/10; A47K 1/00; A47K 4/00; A61H 33/6026–6068

USPC .......................................................... 307/11
See application file for complete search history.

(56) References Cited

U.S. PATENT DOCUMENTS

| | | |
|---|---|---|
| 3,005,109 A | 10/1961 | Funkhouser et al. |
| 4,370,562 A | 1/1983 | Palazzetti et al. |
| 4,419,589 A | 12/1983 | Ross |
| 4,823,413 A | 4/1989 | Chalberg et al. |
| 4,844,333 A | 7/1989 | Davis et al. |
| 5,245,221 A | 9/1993 | Schmidt et al. |
| 5,408,708 A | 4/1995 | Mathis |
| 6,670,584 B1 | 12/2003 | Azizeh |
| 6,993,415 B2 | 1/2006 | Bauer et al. |
| 7,236,692 B2 | 6/2007 | Tran |
| 7,327,275 B2 | 2/2008 | Brochu et al. |
| 7,440,864 B2 | 10/2008 | Otto |
| 7,843,357 B2 | 11/2010 | Brochu et al. |
| 7,982,625 B2 | 7/2011 | Brochu et al. |

(Continued)

*Primary Examiner* — Hal Kaplan
*Assistant Examiner* — Swarna N Chowdhuri
(74) *Attorney, Agent, or Firm* — Larry K. Roberts

(57) ABSTRACT

A control system for a whirlpool bath installation, including a single input source wiring for connecting to an input source of high voltage AC electrical power having a nominal current rating. A plurality of high voltage output connections are connected to the input source through a corresponding plurality of switches, for power connections to a respective high voltage load devices, whose cumulative nominal current draw ratings exceeds the current rating of the input source. An electronic controller controls states of the switches in response to user input commands. The electronic controller implements an algorithm or a set of rules preventing a system utilization of the high voltage loads from exceeding a total current draw exceeding said nominal maximum current rating.

25 Claims, 6 Drawing Sheets

(56) References Cited

U.S. PATENT DOCUMENTS

| | | | |
|---|---|---|---|
| 8,164,470 | B2 | 4/2012 | Brochu et al. |
| 8,549,678 | B2 | 10/2013 | Neidich et al. |
| 8,624,749 | B2 | 1/2014 | Brochu et al. |
| 8,669,494 | B2 | 3/2014 | Tran |
| 8,866,336 | B2 | 10/2014 | Campbell |
| 8,890,357 | B2 | 11/2014 | Campbell |
| 10,071,018 | B2 | 9/2018 | Tempas et al. |
| 10,396,542 | B2 | 8/2019 | Kang et al. |
| 2002/0084699 | A1 | 7/2002 | Kemp |
| 2004/0261167 | A1* | 12/2004 | Panopoulos ............ E04H 4/169 4/490 |
| 2004/0262997 | A1* | 12/2004 | Gull ......................... H02J 9/08 307/64 |
| 2005/0168902 | A1* | 8/2005 | Laflamme .......... G05B 23/0235 361/115 |
| 2007/0118983 | A1 | 5/2007 | Tatum |
| 2008/0094235 | A1* | 4/2008 | Brochu .............. G05B 23/0235 340/635 |
| 2011/0004994 | A1* | 1/2011 | Le ........................ A61H 35/006 4/541.1 |
| 2011/0154814 | A1 | 6/2011 | Campbell |
| 2017/0212484 | A1 | 7/2017 | Potucek et al. |
| 2019/0013766 | A1* | 1/2019 | Stach ........................ H02J 7/35 |
| 2019/0105226 | A1 | 4/2019 | Potucek et al. |

* cited by examiner

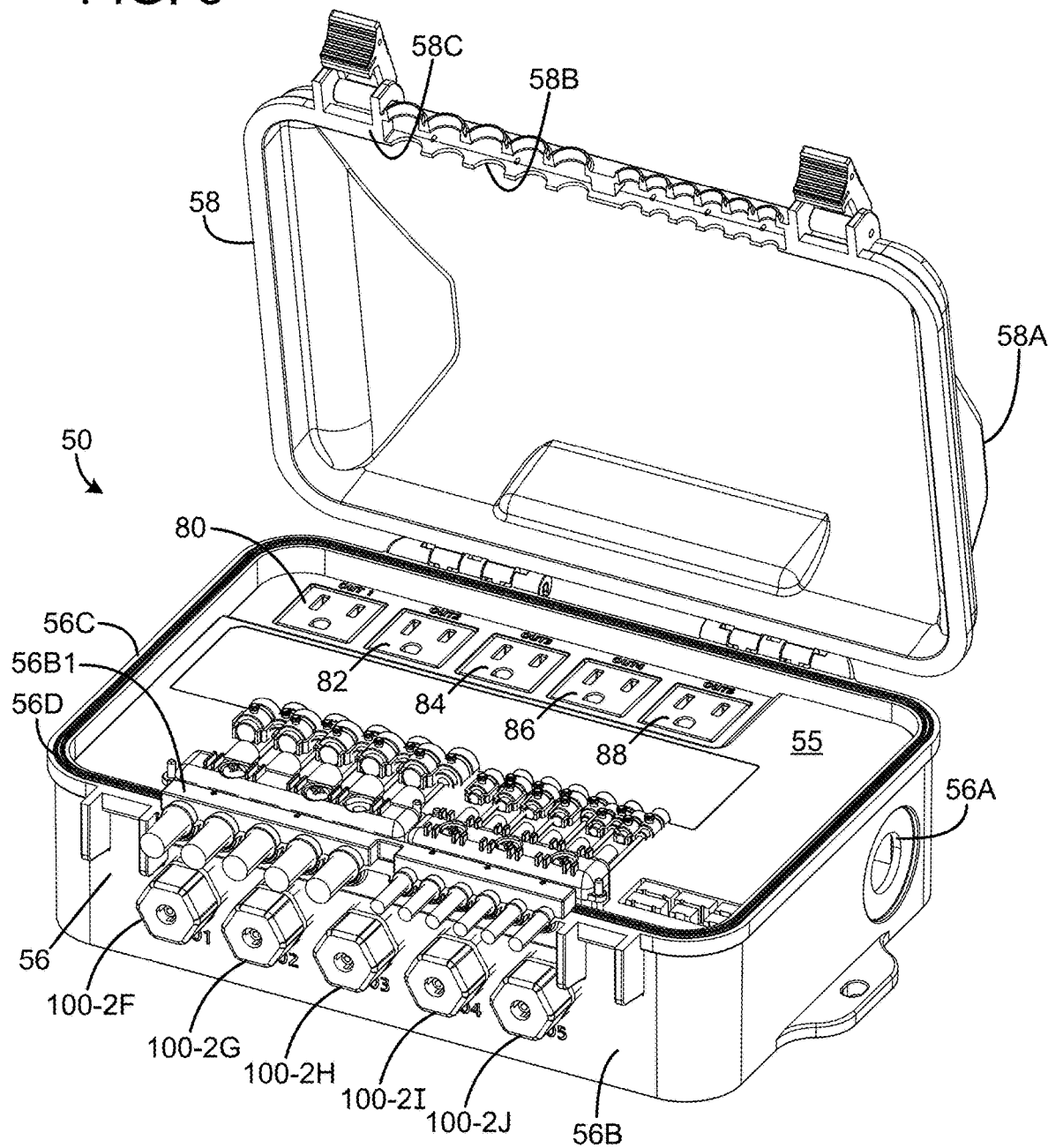

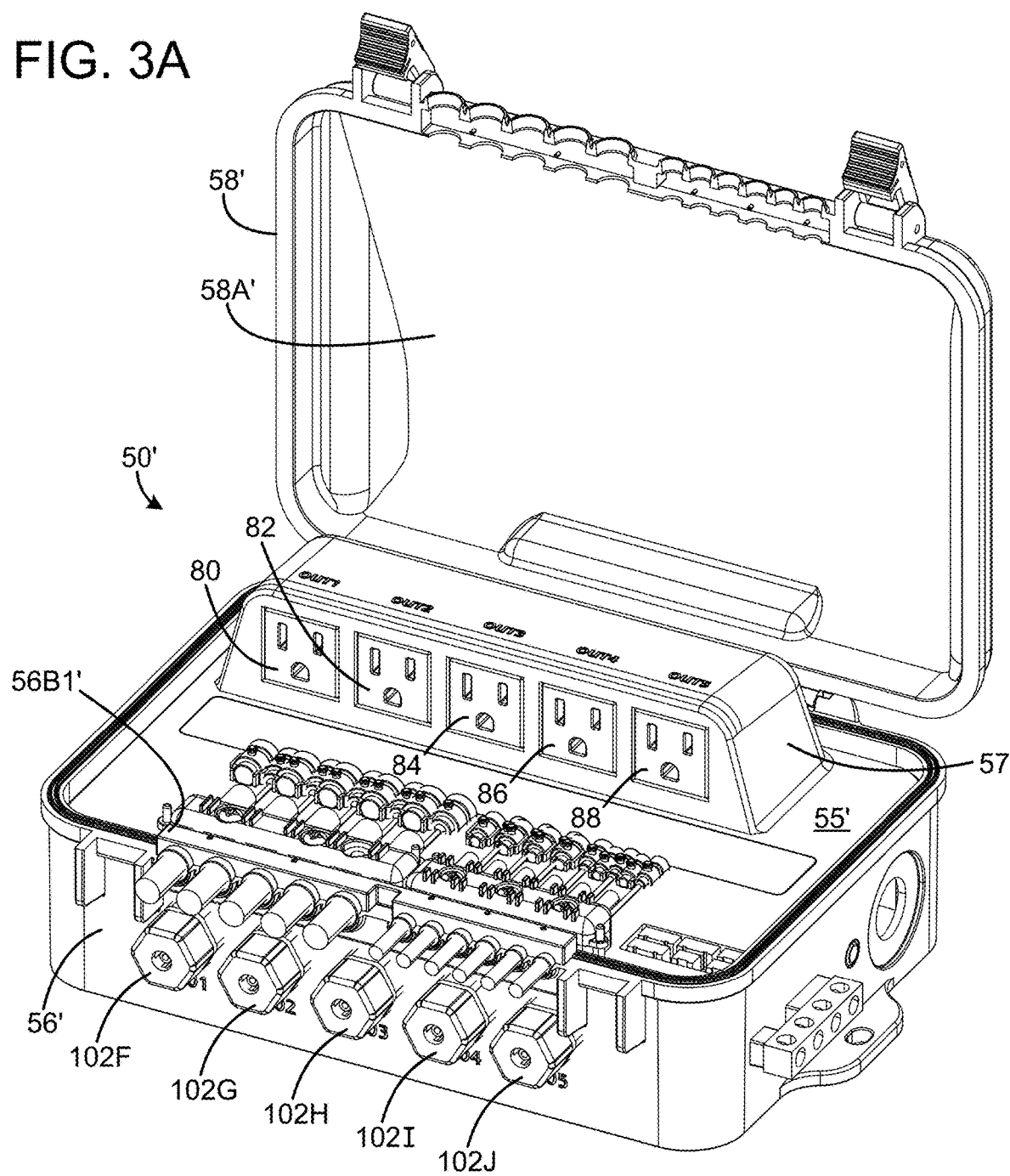

FIG. 4

FIG. 5

WHIRLPOOL BATH CONTROLLER WITH INTELLIGENT LOAD CONTROL TO REDUCE POWER REQUIREMENTS

BACKGROUND

Whirlpool bath installations typically include high power loads such as a heater for heating the bath water, a pump for pumping water through a recirculating water flow path, a blower for air bubble features, and may include a drain pump to quickly drain water from the tub. Low voltage loads may include lighting and valve controls.

The multiple loads have in the past required separate 15 or 20 A circuits be installed for multiple high power loads to the room in which the whirlpool bath is to be installed. For example, the pump(s) and heater typically require separate circuit outlets each on a separate breaker to support the electrical power demands of the installation.

BRIEF DESCRIPTION OF THE DRAWINGS

Features and advantages of the disclosure will readily be appreciated by persons skilled in the art from the following detailed description when read in conjunction with the drawing wherein:

FIG. 3 illustrates an exemplary embodiment of a controller housing with a cover. FIG. 3A illustrates an alternate embodiment of a controller housing with a cover.

FIG. 4 is a table illustrating load control sequences in response to user input via an electronic control panel.

FIG. 5 is a table illustrating load control in response to user input via air button actuations.

DETAILED DESCRIPTION

Figure 1:
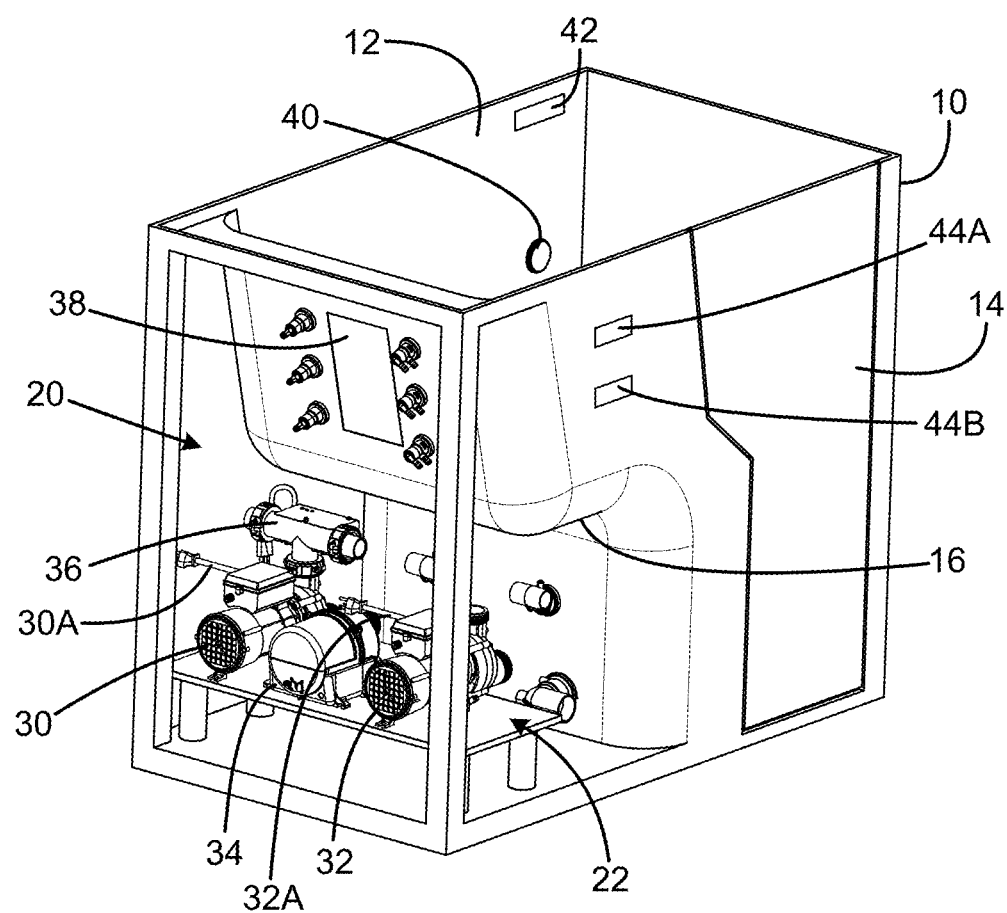
FIG. 1 is a diagrammatic illustration of a whirlpool bath installation.

In the following detailed description and in the several figures of the drawing, like elements are identified with like reference numerals. The figures are not to scale, and relative feature sizes may be exaggerated for illustrative purposes.

FIG. 1 diagrammatically illustrates an exemplary whirlpool bath installation which employs a controller to control operation of the system devices. The installation in this example is a walk-in tub installation, which includes a tub structure 10 which includes a water reservoir defined by the tub structure, and a door 14 which swings on hinges from a water-tight closed position (shown in FIG. 1), and an open position which allows the user ready egress into and from the water reservoir. Typically, the tub structure 10 defines a seat platform 16 for the user to sit while bathing with the door closed, and water filling the reservoir to a comfortable level for the user. Valve elements allow the user to control the filling of the bathing water into the tub reservoir.

The tub structure 10 defines an open space 20 under and behind the seat 16, into which the tub installation pumps, controller, various other equipment and water pipes may be installed. The installation equipment may be mounted within the space 20, e.g. to a platform 22. A user interface control panel 42 may be positioned for ready access by the user, to control operation of the tub functions.

The tub installation includes a network of water jets through which water is pumped by the whirlpool pump under pressure to provide a therapeutic effect for the user. A recirculating water flow path is provided, with the pump drawing bathing water from the reservoir through a suction fitting (not shown), and direct pressurized water from the pump to the water jets.

Another function which may be implemented in an exemplary embodiment is a rapid water discharge function, activated by the user once finished bathing, to actively pump water out from the reservoir into the drain, to speed up the tub drain process so that the user when finished bathing, may open the door 14 without water escaping through the door opening. A drain pump may implement this function.

The installation may include high voltage loads as diagrammatically depicted in FIG. 1, including a whirlpool pump 30 to pump water through a recirculating water flow path including jets, a water heater 36 in the water flow path for heating the water, a blower 34 for blowing air through air jets or an air channel, and a drain pump 32 to quickly drain water from the whirlpool tub. Another high voltage load which may be included is a heat pad 38 to warm the tub in the area of the user's shoulders, for example. Some of these loads may be omitted from the system, depending on the installation. The high voltage loads typically include power cables and line voltage sockets, such as illustrated in FIG. 1 as power cords and sockets 30A for pump 30 and 32A for the drain pump 32. In a conventional installation, each of the power connectors for the high voltage loads would be connected to individual line voltage sockets installed near the tub installation, typically on a wall.

The installation may also include low voltage loads, such as lights 40, and electrically controlled valves 44A and 44B to control the flow of water through different paths or to different devices.

Figure 2:
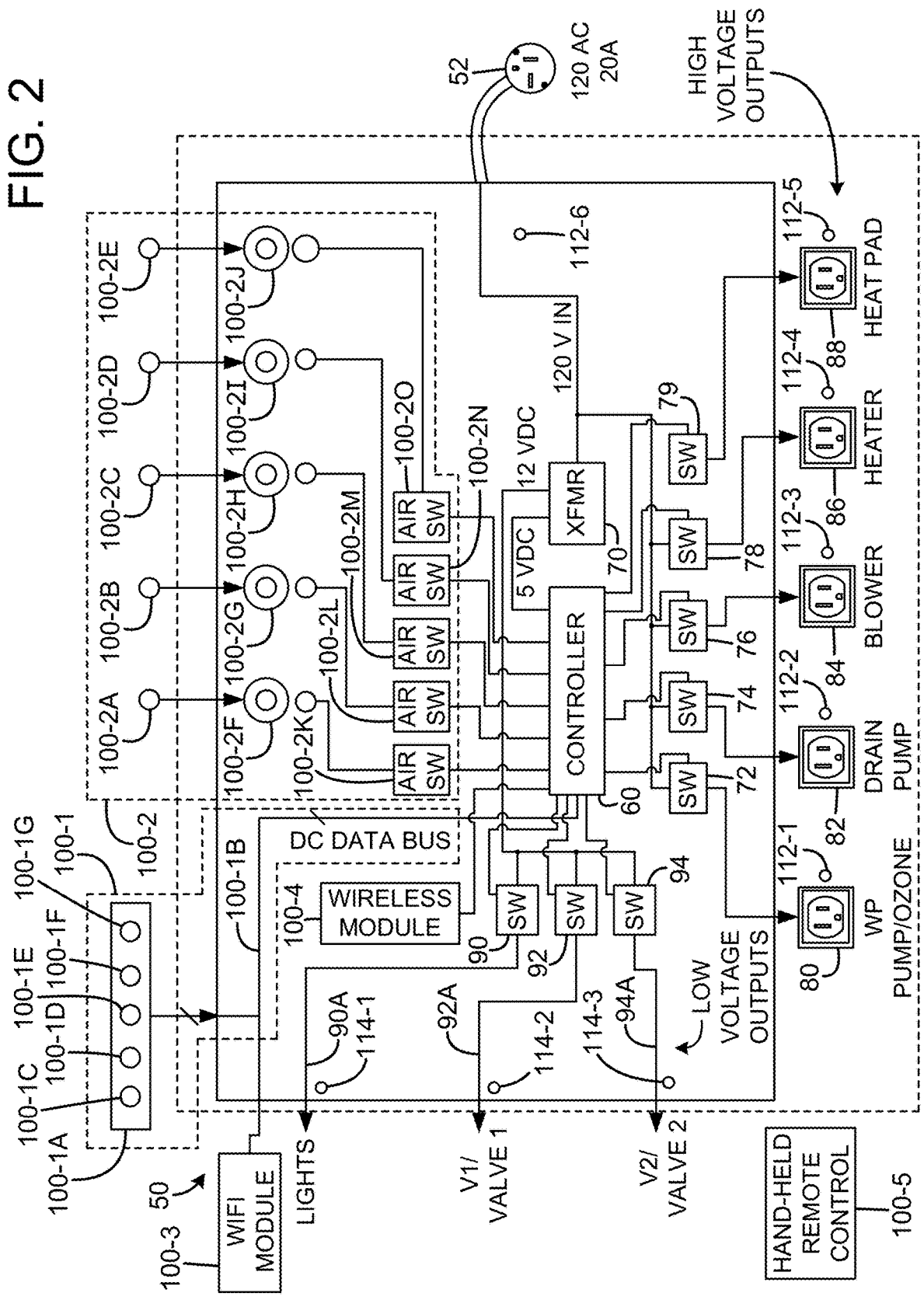
FIG. 2 is a schematic diagram illustrating an exemplary embodiment of a controller for a whirlpool bath in accordance with aspects of the invention.

FIG. 2 is a schematic diagram of an exemplary embodiment of a control system 50 for a whirlpool bath installation. In accordance with aspects of the invention, the exemplary embodiment of the control system 50 includes a single high voltage input power plug connector 52, in this example a 120V AC connector for 20A service. The connector 52 will be connected to a line voltage service connector located near the tub installation, e.g. on an adjacent wall. The system also includes a controller 60, which in an exemplary embodiment includes a microprocessor, microcomputer, a gate array or other logic circuitry programmed or programmable to perform the functions described below.

In accordance with an aspect of the invention, the system 50 does not include, and is free of, over-limit power protections for the bathing installation or its devices. By "over-limit power protections" is meant that the system relies on the circuit breaker on the line voltage service circuit to which the plug connector 52 for the system is connected; no circuit breakers or fuses are incorporated in the circuitry of the system 50 to provide current or voltage protection. Each of the high power loads (pumps, blower, whirlpool heater, heat pad) that plug into the sockets on the system 50 are to be agency approved (such as Underwriters Laboratories (UL)) and as such will have their own agency required certification protection in place. The only current protection is provided by a circuit breaker on the input power service to which the power connector 52 is connected.

The control system 50 is configured to distribute electrical power to a plurality of high voltage loads, which if actuated simultaneously would exceed the available current draw through the input power service. In an exemplary embodiment, the control system 50 performs this by managing the on/off status of the high power loads, as well as the low voltage loads, so that the available current is not exceeded.

The system 50 includes a plurality of connector sockets 80, 82, 84, 86 and 88 in this example, which are available for plug-in of the power cords for the high voltage loads. In an exemplary embodiment, the sockets are NEMA receptacles, mounted to the housing of the system, making it convenient to connect the power cords of the loads during installation. As shown in FIG. 2, AC power is connected through respective switches 72, 74, 76, 78 and 79 to the corresponding connector sockets. The switches may be relays, triacs, SCRs or other devices, and are controlled by outputs of the controller 60.

In this exemplary embodiment, socket 80 is assigned to the whirlpool pump for pumping water through the bath jets, and which nominally draws 8 Amps. An ozone generator can also be powered through the socket 80, either by use of a piggyback plug or by plugging the ozone generator electrical power cord into an auxiliary outlet on the whirlpool pump, as described in U.S. Pat. No. 8,866,336, the entire contents of which are incorporated herein by this reference. Socket 82 is assigned to the drain pump for rapid discharge of the water from the bath tub, and which nominally draws 5.5 Amps. Socket 84 is assigned to the air blower for blowing air through the tub jets, and nominally draws 8 Amps. Socket 86 is assigned to the system heater for heating water in the recirculating water flow path, and which nominally draws 10.5 Amp. These nominal current draws are the rated current draws, and are exemplary only. All loads cannot be powered on simultaneously without the rated current draw exceeding the available current capacity (20 Amps) and tripping a circuit breaker. Typically for conventional installations, separate services, each with an associated power socket, would be required to service the high voltage loads.

In an exemplary embodiment, switch 76, controlling current drive to the socket 84 associated with a blower, is a triac to allow the controller 60 to modulate the current drive to the blower, e.g. to allow current levels of 40%, 50%, 60%, 70%, 80%, 90% and 100%, as well as off (0%). In an exemplary embodiment, the controller 60 is configured to energize socket 84 at 100% current for two minutes as a purge cycle, after twenty minutes has elapsed from the last command to the controller 60.

The bath installation may also include low voltage loads, such as lights, an ozone generator, a heat pad attached to the outside of the bath tub to warm an area of the tub before the tub fills with warm water, and valves for controlling the water flow through the plumbing of the installation. The system 50 includes a transformer 70 connected to the input AC power to transform into 12 VDC for powering the low voltage loads, and 5 VDC for powering the controller 60. The 12 VDC power is connected through switches 90, 92 and 94 to the low power loads, in this example lights and actuators for valves V1 and V2. Outputs of the controller 60 determine the status of the switches to selectively apply power to the low voltage loads.

Indicator lights 112-1, 112-2, 112-3, 112-4 and 112-5, may be provided to visually indicate the energization status of the high power sockets 80, 82, 84, 86, 88. Similarly, indicator lights 114-1, 114-2 and 114-3 may be included to indicate the energization status of the low voltage lines 90A, 92A and 94A. An indicator light 112-6 may be provided to indicate when the control system 50 is plugged into a wall outlet and the wall outlet has power.

The control system preferably includes a housing 56 for mounting the electronic controller, the transformer, the switches and the output high voltage and low voltage connections. FIG. 3 illustrates an exemplary embodiment of a housing 56 with a cover 58. An interior working panel 55 is mounted inside the housing 56. The high voltage output sockets 80, 82, 84, 86 and 88 are positioned on the panel 55 within the housing so that corresponding wiring connectors for the respective loads can be electrically connected to the high voltage sockets, e.g. inserted into, instead of to respective separate high voltage service sockets on separate service circuits. The housing 56 includes a side port 56A for the single input electrical power connection 52. The housing 56 also mounts on side 56B the air switch receptacles 100-2F, 100-2G, 100-2H, 100-2I and 100-2J.

The cover 58 includes a dome 58A over the high voltage sockets to provide clearance for the load device connectors plugged into the sockets Power and low voltage cord strain relief is provided by scalloped regions underlaying bracket 56B1 which are formed in edge 56C of the housing 56. The power and low voltage wires are passed under the bracket, which is held in place by screw fasteners (not shown). FIG. 3 shows dummy wires held in place by the bracket 59. Scalloped regions 58B are formed in the edge 58C of the cover 58 and compress the cords.

The housing 56 and cover 58 may be injection molded from a plastic material. An elastomeric gasket 56D is fitted to a groove in the edge 56C for sealing the cover to the housing.

FIG. 3A illustrates an alternate embodiment of a control system 50' with a housing structure 56'. In this embodiment, the high voltage connector sockets 80, 82, 84, 86, 88 are mounted in a boss structure 57, and are oriented in a plane transverse to the panel surface 55'. With this arrangement, the power cords connected to the sockets may be directed out along the panel to the edge of the housing under bracket 56B1', so that the dome 58A' in the cover 58' may be reduced in height, in comparison to the dome 58A in the embodiment of FIG. 3. The power cords may be engaged by strain relief as in the embodiment of FIG. 3. In other embodiments, the boss could orient the plug sockets to an angle other than 90 degrees relative to the panel surface 55', such as 45 degrees.

The control system 50 may receive user commands to control the bathing installation operation. In exemplary embodiments, the system control inputs may be provided in one or more of several ways, through a control panel input system 100-1, through a set 100-2 of air buttons, by Wifi signals received through WiFi module 100-3 which may optional be connect to data bus 100-1B, or by wireless signals from a hand-held remote control which communicate with wireless module 100-4 in communication with controller 60. The system 50 may include one control input system or any combination of the control input systems.

The control panel system includes control panel 100-1A with a set of buttons 100-1C-100-1G which may be activated by the user. The panel is connected to the controller 60 by a DC data bus 100-1B.

The air button set 100-2 includes receptacles 100-2F-100-2J (FIG. 2) for connection to air tubes from the respective air buttons 100-2A-100-2E mounted on a surface such as a surface of the tub, for example. The receptacles are connected by air lines to the respective air switches 100-2K-100-2N, whose outputs are electrical switch status signals connected to inputs of the controller 60.

The control system 50 further optionally includes a wireless module 100-4 (FIG. 2) connected to the controller 60, which is responsive to wireless (e.g. RF, infrared or Bluetooth™) signals from a remote control 100-5. The remote control device may be a hand-held device. The module 100-4 could also be a Bluetooth module connected to a user's smart phone or tablet running an application program for the system.

The control system further optionally includes a WiFi module 100-3 connected to the data buss 100-1B, which is configured to receive control signals from a WiFi network.

In accordance with an aspect of the invention, the controller 60 implements a control sequence responsive to the user inputs which manages the power distribution to avoid exceeding the available current through the single AC input 52.

FIG. 4 is a table illustrating the operation of the control system 50 in response to user input from the electronic control panel 100-1. The operation is controlled by rules governing the activation states of the various loads. The rules may be implemented by programming an algorithm in a microprocessor or microcomputer, for example. Alternatively, the rules may be implemented by hard-wired gate arrays.

This exemplary embodiment has a load configuration of a heat pad, a jets (whirlpool) pump, a blower pump, lights, a drain pump and a water heater. The left-most column "Button Pressed" with buttons 1 . . . 5 correlates to buttons 100-1C . . . 100-1G in FIG. 2. In response to a first button push of button 100-1C, socket 88 associated with the heat pad is energized, with a 35-minute time out, which is independent of all other timers. A second button push will turn off socket 88 for the heat pad. A typical heat pad may operate at 115 VAC with a current rating of 1 Amp, or alternatively at 24 V DC with a nominal current draw of 4 A, powered through a transformer connected to socket 88.

The second button 100-1D in input system 100-1 is assigned to control the jets (whirlpool) pump associated with socket 80. As noted in FIG. 4, the first button push energizes sockets 80 and 86 to turn on the pump and also the heater (assigned to socket 86) for a 20 minute timeout period. The drain pump (socket 82) as well as low voltage outputs 92A, 94A are turned off. So at this state, the high voltage loads (whirlpool pump and heater) nominally draw 18.5 A, less than the 20 A service. A second button de-energizes sockets 80 and 86 to turn off the whirlpool pump and the heater.

The third button 100-1 E in input system 100-1 is assigned to control the blower (socket 84). A first button push energizes socket 84 to turn on the blower and de-energizes socket 86 to turn off the heater. By pressing and holding the third button, the drive current to the blower is modulated through a scroll process, from 40% and increasing by increments of 10%, then repeating from 40%. With the blower and pump on at 100%, the high voltage loads draw 167A in an exemplary embodiment. A further button push after the first or after a press and hold de-energizes socket 86 to turn off the blower.

The fourth button 100-1F in input system 100-1 is assigned to control switch 90 and the low voltage output, in this case assigned to a light or lights. The first button push turns the light on, with a 20 minute timeout; a second button push turns the light off. The timeout is independent of all other timers.

The fifth button 100-1G in input system 100-1 is assigned to the drain pump (socket 82). A first button push energizes socket 82 to turn on the drain pump for a 3 minute timeout, and de-energizes sockets 80, 84, 86 and low voltage outputs 92A, 94A to ensure that the blower, the heater, pump and low voltage loads are all turned off. In this exemplary embodiment, the controller 60 ensures that sockets 80 and 84 for the whirlpool pump and the blower cannot be energized when socket 84 for the drain pump is energized. A second button push de-energizes socket 84 to turn the drain pump off.

Figure 5:
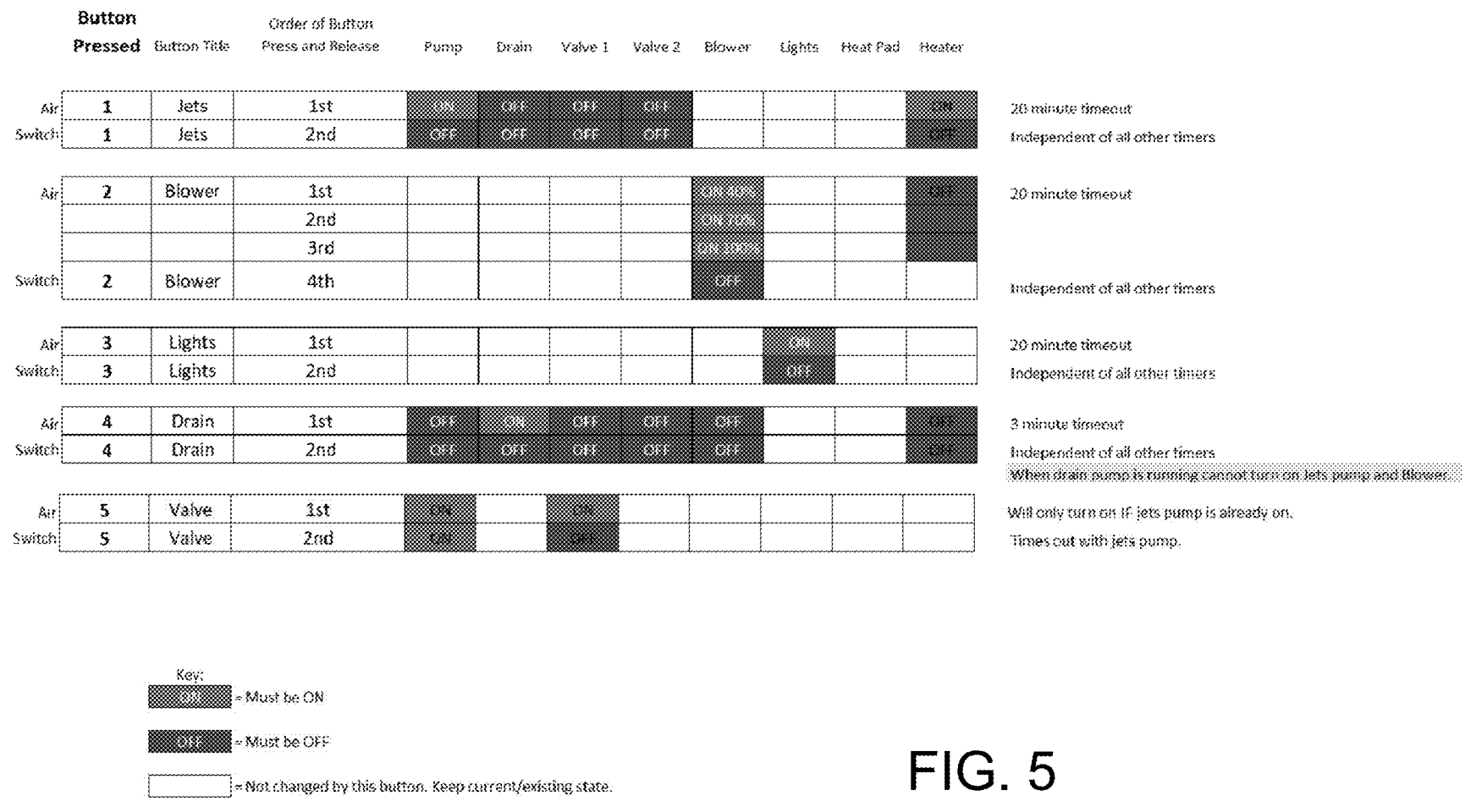

FIG. 5 illustrates an exemplary embodiment of the programmed states of the loads in response to air switch presses using the input system 100-2 (FIG. 2). In response to a first press of button 1 (102-2A), sockets 80 and 86 for the whirlpool pump (socket 80) and the heater (socket 86) are energized for a timeout period (20 minutes in this example), with socket 82 for the drain pump and the low voltage outputs (92A, 94A) are de-energized. Air switch 2 (100-2B) controls socket 84 for the blower. First, second and third button pushes and releases will energize the socket 84 at 40%, 70% and 100% of maximum current draw, respectively, in this embodiment. A fourth button push and release will de-energize socket 84 to turn the blower off. As noted above, the controller 60 is configured to energize socket 84 at 100% current draw for a purge cycle twenty minutes after the last command to the controller from the input system.

The lights powered by low voltage output 90A are controlled by air switch 3 (100-2C). A first button push turns the lights on for a 20 minute timeout; a second button push turns the lights off. The operation of lights is independent of all other timers. The fourth button (100-2D) controls the drain pump (socket 82). A first button push turns the drain pump on for a 3 minute timeout, and the whirlpool pump, heater, blower and low voltage outputs 92A and 94A off. A second button push within the timeout turns the drain pump off.

Air switch 5 (100-2E) in this exemplary embodiment controls the low voltage output 92A, which may drive a valve for directing water flow in the recirculating water flow path. The controller 60 is programmed to only turn the valve on (open) in response to a first button push if the whirlpool pump is on; a second button push turns the valve off (closed). The low voltage outlet 92A will time out with the whirlpool pump.

Although the foregoing has been a description and illustration of specific embodiments of the invention, various modifications and changes thereto can be made by persons skilled in the art without departing from the scope and spirit of the invention. For example, the controller may be programmed with different time intervals or control sequences. Also, air switch 100-2E might be programmed to turn outlet 88 on/off for a heat pad. Further, different load devices may be employed. For example, the load device 32 may be a micro-bubble pump instead of a drain pump, and the plumbing adapted to support the micro-bubble pump. Such a pump forces water under pressure with a small amount of entrained air to create milky appearance. In this case, the programming would be the same, except the timer is changed to twenty minutes instead of three minutes (FIGS. 4, 5) in one example.

What is claimed is:

1. A control system for a whirlpool bath installation, the control system comprising:
   a single input source wiring for connecting to an input source of high voltage AC electrical power having a predetermined nominal maximum current rating;
   a plurality of high voltage output connector sockets electrically connected to the single input source wiring through a corresponding plurality of switches, the high voltage output connector sockets configured for power connections to a respective plurality of high voltage load devices, whose cumulative nominal current draw ratings exceed said current rating of the input source;
   the high voltage load devices including a respective power cord and a power connector adapted to connect to high voltage service connector sockets including the high voltage connector sockets of the control system;

an electronic controller configured to control states of the switches in response to user input commands received through a system input system, the electronic controller implementing a set of rules preventing a system utilization of the high voltage loads from exceeding a total current draw exceeding said nominal maximum current rating to an extent to cause a circuit breaker or fuse protecting the input source from tripping; and wherein the control system is free of over-limit power protections for loads powered by the system.

2. The control system of claim 1, wherein the whirlpool bath installation includes a tub, and the high voltage load devices include at least one of a whirlpool pump for pumping water through one or more bath jets, a heater for heating the water, a blower for blowing air through the bath jets or another jet or jets or an air channel, and a drain pump for draining water from the tub.

3. The control system of claim 2, wherein the whirlpool bath installation includes all of the whirlpool pump, the heater, the blower and the drain pump, and the electronic controller is configured to prevent the whirlpool pump, the heater and the blower from operating while the drain pump is operating.

4. The control system of claim 1, wherein the system input system comprises an electronic control panel comprising a set of switches responsive to the user's tactile manipulation.

5. The control system of claim 1, wherein the system input system comprises a set of air switches connected to air buttons.

6. The control system of claim 1, further comprising:
a transformer for converting the high voltage AC input power to low voltage DC power;
one or more low voltage outputs connected to the low voltage DC power through one or more low voltage switches controlled by the electronic controller in response to user input commands to activate one or more low voltage loads;
and wherein said set of rules permits said low voltage loads to be energized without regard to energization states of the high-voltage loads.

7. The control system of claim 1, further comprising:
a transformer for transforming high voltage AC input power to low voltage DC power;
a housing for mounting the electronic controller, the transformer, the plurality of switches and the plurality of high voltage connector sockets;
the high voltage connector sockets being positioned in the housing so that corresponding wiring connectors for the respective loads can be electrically connected to the high voltage connector sockets instead of to respective separate high voltage service connectors.

8. The control system of claim 1, wherein the system input system comprises an electronic control panel including a set of switches responsive to the user's tactile manipulation, and a set of air switches connected to air buttons.

9. The control system of claim 1, further comprising:
a housing for mounting the electronic controller, the plurality of switches and the plurality of high voltage connector sockets;
the high-power connector sockets being positioned in the housing so that corresponding wiring connectors for the respective loads can be electrically connected to the high voltage connector sockets instead of to respective separate high voltage service connectors; and
wherein the housing includes a removable or openable cover to enclose the corresponding wiring connectors in a closed position.

10. The control system of claim 1, wherein the bath installation includes a tub, and the high voltage load devices include at least one of a whirlpool pump for pumping water through one or more bath jets, a heater for heating the water, a blower for blowing air through the bath jets or another jet or jets or an air channel, and a micro-bubble pump for forcing water with entrained air through one or more jets.

11. A control system for a whirlpool bath installation, wherein the bath installation includes a tub, and the high voltage load devices include at least one of a whirlpool pump for pumping water through one or more bath jets, a heater for heating the water, a blower for blowing air through the bath jets or another jet or jets or an air channel, and a micro-bubble pump for forcing water with entrained air through one or more jets, the control system comprising:
a single input source wiring for connecting to an input source of high voltage AC electrical power having a predetermined nominal maximum current rating;
a plurality of high voltage output connector sockets electrically connected to the single input source wiring through a corresponding plurality of switches, the high voltage output connector sockets configured for power connections to a respective plurality of high voltage load devices, whose cumulative nominal current draw ratings exceed said current rating of the input source;
the high voltage load devices including a respective power cord and a power connector adapted to connect to high voltage service connector sockets including the high voltage connector sockets of the control system;
an electronic controller configured to control states of the switches in response to user input commands received through a system input system, the electronic controller implementing an algorithm or a set of rules preventing a system utilization of the high voltage loads from exceeding a total current draw exceeding said nominal maximum current rating to an extent to cause a circuit breaker or fuse protecting the input source from tripping;
wherein the high voltage load devices include each of the whirlpool pump, the heater, the blower and the micro-bubble pump, and the electronic controller is configured to prevent the whirlpool pump, the heater and the blower from operating while the micro-bubble pump is operating.

12. A control system for a whirlpool bath installation including a tub, the control system comprising:
a single input source wiring for connecting to an input source of high voltage AC electrical power having a predetermined nominal maximum current rating;
a plurality of high voltage output connector sockets electrically, connected to the single input source wiring through a corresponding plurality of switches, the high voltage output connector sockets configured for power connections to a respective plurality of high voltage load devices, whose cumulative nominal current draw ratings exceed said current rating of the input source;
an electronic controller configured to control states of the switches in response to user input commands received through a system input system, the electronic controller implementing a set of rules preventing a system utilization of the high voltage loads from exceeding a total current draw exceeding said nominal maximum current rating to an extent to cause a circuit breaker or fuse protecting the input source from tripping;
a transformer for converting the high voltage AC input power to low voltage DC power;

one or more low voltage outputs connected to the low voltage DC power through one or more low voltage switches controlled by the electronic controller in response to user input commands to activate one or more low voltage loads;

wherein said set of rules permit said low voltage loads to be energized without regard to energization states of the high-voltage loads; and wherein the control system is free of over-limit power protections for loads powered by the system.

13. The control system of claim 12, wherein the high voltage load devices include at least one of a whirlpool pump for pumping water through one or more bath jets, a heater for heating the water, and a blower for blowing air through the bath jets or another jet or jets or an air channel, and a drain pump for draining water from the tub.

14. The control system of claim 13, wherein the high voltage load devices include the blower, and the set of switches includes a blower switch configured to modulate current flow to the blower to intermediate current flows between 0% and 100%, the input system includes a button assigned to a blower function, and the electronic controller is responsive to successive button actuations to scroll the current flow through successive current flow levels.

15. The control system of claim 13, wherein the high voltage load devices include the blower, and the electronic controller is configured to initiate a purge cycle to actuate the blower a predetermined time interval after receipt of a last user command.

16. The control system of claim 13, wherein the high voltage load devices include the whirlpool pump and the heater, and the electronic controller is further configured to prevent the heater from being activated unless the whirlpool pump is also activated.

17. The control system of claim 13, wherein the high voltage load devices include the whirlpool pump, the heater, the blower and the drain pump, and the electronic controller is configured to prevent the whirlpool pump, the heater and the blower from operating while the drain pump is operating.

18. The control system of claim 12, further comprising:
a housing for mounting the electronic controller, the plurality of switches and the plurality of high voltage connector sockets;
the high voltage connector sockets being positioned in the housing so that corresponding wiring connectors for the respective loads can be electrically connected to the high voltage connector sockets instead of to respective separate high voltage service connectors; and
wherein the housing includes a removable or openable cover to enclose the corresponding wiring connectors in a closed position.

19. The control system of claim 18, further including a panel mounted in the housing and including a protruding boss structure, the high voltage connector sockets mounted in the boss structure transverse to the panel.

20. The control system of claim 12, wherein the system input system comprises one or more of an electronic control panel including a set of switches responsive to the user's tactile manipulation, a set of air switches connected to air buttons, a wireless module responsive to wireless commands received from a wireless remote control device, and a WiFi module responsive to commands received wirelessly.

21. The control system of claim 12, wherein:
the high voltage load devices including a respective power cord and a power connector adapted to connect to high voltage service connector sockets including the high voltage connector sockets of the control system.

22. The control system of claim 12, wherein the bath installation includes a tub, and the high voltage load devices include at least one of a whirlpool pump for pumping water through one or more bath jets, a heater for heating the water, a blower for blowing air through the bath jets or another jet or jets or an air channel, and a micro-bubble pump for forcing water with entrained air through one or more jets.

23. A control system for a whirlpool bath installation including a tub, the control system comprising:
a single input source wiring for connecting to an input source of high voltage AC electrical power having a predetermined nominal maximum current rating;
a plurality of high voltage output connector sockets electrically, connected to the single input source wiring through a corresponding plurality of switches, the high voltage output connector sockets configured for power connections to a respective plurality of high voltage load devices, whose cumulative nominal current draw ratings exceed said current rating of the input source;
an electronic controller configured to control states of the switches in response to user input commands received through a system input system, the electronic controller implementing an algorithm or a set of rules preventing a system utilization of the high voltage loads from exceeding a total current draw exceeding said nominal maximum current rating to an extent to cause a circuit breaker or fuse protecting the input source from tripping;
a transformer for converting the high voltage AC input power to low voltage DC power;
one or more low voltage outputs connected to the low voltage DC power through one or more low voltage switches controlled by the electronic controller in response to user input commands to activate one or more low voltage loads;
wherein said rules or algorithm permit said low voltage loads to be energized without regard to energization states of the high-voltage loads; and
wherein the control system is free of over-limit power protections for loads powered by the system;
wherein the whirlpool bath installation includes a tub, and the high voltage load devices include at least one of a whirlpool pump for pumping water through one or more bath jets, a heater for heating the water, a blower for blowing air through the bath jets or another jet or jets or an air channel, and a micro-bubble pump for forcing water with entrained air through one or more jets; and
wherein the bath installation includes the whirlpool pump, the heater, the blower and the micro-bubble pump, and the electronic controller is configured to prevent the whirlpool pump, the heater and the blower from operating while the micro-bubble pump is operating.

24. The control system of claim 1, wherein the set of rules is implemented by an algorithm programmed into a microprocessor or microcomputer comprising the electronic controller.

25. The control system of claim 12, wherein the set of rules is implemented by an algorithm programmed into a microprocessor or microcomputer comprising the electronic controller.

* * * * *

UNITED STATES PATENT AND TRADEMARK OFFICE
CERTIFICATE OF CORRECTION

| | | |
|---|---|---|
| PATENT NO. | : 11,522,326 B2 | Page 1 of 1 |
| APPLICATION NO. | : 16/776435 | |
| DATED | : December 6, 2022 | |
| INVENTOR(S) | : Graham J. Campbell | |

It is certified that error appears in the above-identified patent and that said Letters Patent is hereby corrected as shown below:

In the Specification

At Column 5, Line 48, replace "167A" with --16A--.

Signed and Sealed this
Twenty-eighth Day of March, 2023

Katherine Kelly Vidal
*Director of the United States Patent and Trademark Office*